(12) United States Patent
Stefan et al.

(10) Patent No.: US 10,328,843 B2
(45) Date of Patent: Jun. 25, 2019

(54) DRIVING ASSISTANCE SYSTEM WITH SHORT-DISTANCE RANGING

(71) Applicant: FORD GLOBAL TECHNOLOGIES, LLC, Dearborn, MI (US)

(72) Inventors: Frederic Stefan, Aachen NRW (DE); Christoph Arndt, Moerlen Rhineland-Pfalz (DE); Uwe Gussen, Huertgenwald NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/940,674

(22) Filed: Mar. 29, 2018

(65) Prior Publication Data

US 2018/0297506 A1   Oct. 18, 2018

(30) Foreign Application Priority Data

Apr. 12, 2017   (DE) ........................ 10 2017 206 310

(51) Int. Cl.
*B60Q 1/00* (2006.01)
*G01S 17/93* (2006.01)
(Continued)

(52) U.S. Cl.
CPC ......... *B60Q 1/0023* (2013.01); *B60Q 1/1423* (2013.01); *B60Q 1/22* (2013.01);
(Continued)

(58) Field of Classification Search
CPC combination set(s) only.
See application file for complete search history.

(56) References Cited

U.S. PATENT DOCUMENTS

| 5,754,123 A | 5/1998 | Nashif et al. |
| 7,518,545 B2 | 4/2009 | Minichshofer |

(Continued)

FOREIGN PATENT DOCUMENTS

| DE | 3302771 A1 | 8/1984 |
| DE | 29819209 U1 | 4/1999 |

(Continued)

OTHER PUBLICATIONS

Mustapha et al., Ultrasonic and Infrared Sensors Performance in a Wireless Obstacle Detection System, 2013, IEEE Computer Society, 978-1-4799-3251-1/13, pp. 487-491. (Year: 2013).*

(Continued)

*Primary Examiner* — Nabil H Syed
*Assistant Examiner* — Cal J Eustaquio
(74) *Attorney, Agent, or Firm* — Frank A. MacKenzie; Brooks Kushman P.C.

(57) ABSTRACT

A driving assistance system for a vehicle has a longer-distance sensor device for determining longer-distance information between a vehicle and an obstacle, and a shorter-distance sensor device for determining shorter-distance information between the vehicle and the obstacle. A dual-mode light emitting diode (LED module) can selectively emit both visible light and infrared light, and is part of the vehicle's driving-lights system, such as a headlight and/or a reversing light. The LED module emits infrared light when operating as part of the shorter-distance sensor device and an infrared receiver detects the reflected infrared light for distance determination. The longer-distance sensor device uses ultrasonic waves to determine distance information, and when it indicates that the distance has fallen below a threshold distance (below which the longer-distance sensing device is not reliable), a controller activates the shorter-distance sensing device.

15 Claims, 3 Drawing Sheets

(51) Int. Cl.
    *G01S 17/08* (2006.01)
    *G01S 15/93* (2006.01)
    *B60Q 9/00* (2006.01)
    *G01S 15/08* (2006.01)
    *G01S 17/02* (2006.01)
    *G01S 15/02* (2006.01)
    *G01S 7/481* (2006.01)
    *B60Q 1/14* (2006.01)
    *B60Q 1/22* (2006.01)

(52) U.S. Cl.
    CPC ............ *B60Q 9/006* (2013.01); *G01S 7/4814* (2013.01); *G01S 15/025* (2013.01); *G01S 15/08* (2013.01); *G01S 15/931* (2013.01); *G01S 17/023* (2013.01); *G01S 17/08* (2013.01); *G01S 17/936* (2013.01); *B60Q 2300/314* (2013.01); *G01S 2015/933* (2013.01)

(56) References Cited

U.S. PATENT DOCUMENTS

| | | |
|---|---|---|
| 9,174,676 B2 | 11/2015 | Jecker et al. |
| 9,696,420 B2 | 7/2017 | Shaffer et al. |
| 2004/0258279 A1* | 12/2004 | Hirvonen ........... G06K 9/00201 382/104 |
| 2007/0282503 A1 | 12/2007 | Luke et al. |
| 2008/0167781 A1* | 7/2008 | Labuhn ................ B60W 30/08 701/48 |
| 2013/0258688 A1* | 10/2013 | Kalapodas ............ B60Q 1/085 362/465 |

FOREIGN PATENT DOCUMENTS

| | | |
|---|---|---|
| DE | 102006007150 A1 | 2/2007 |
| DE | 102009054101 A1 | 6/2010 |
| DE | 102010062322 A1 | 6/2012 |
| KR | 20150038776 A | 4/2015 |
| KR | 20160015752 A | 2/2016 |
| WO | 20130127666 A1 | 9/2013 |

OTHER PUBLICATIONS

DE Examination Report for DE Application 10 2017 206 310.6 dated Jan. 31, 2018, 8 pages.

* cited by examiner

DRIVING ASSISTANCE SYSTEM WITH SHORT-DISTANCE RANGING

CROSS-REFERENCE TO RELATED APPLICATIONS

This application claims foreign priority benefits under 35 U.S.C. § 119(a)-(d) to Application DE 10 2017 206 310.6 filed Apr. 12, 2017, which is hereby incorporated by reference in its entirety.

TECHNICAL FIELD

The present invention relates to a driving assistance system for a vehicle. Moreover, the present invention relates to a method for operating a driving assistance system.

BACKGROUND

Driving assistance systems can assist the driver of a vehicle in controlling the vehicle, for example in maneuvering between obstacles, on narrow roads or when parking in a parking space. Driving assistance systems can have sensors for detecting the surroundings, and can give the driver information concerning the driving maneuver conducted by the driver, for example in the form of visual or acoustic signals. Automatic driving assistance systems include those systems which perform not only the detection of information about the surroundings, but also the control of the vehicle, for example when parking. Furthermore, other systems provide for automatically calculating a suitable route and also for executing the required driving maneuver, but delegate to the driver far-reaching control possibilities for intervening in the otherwise automatically proceeding driving maneuver.

In this case, the space available for maneuvering needs to be detected as exactly as possible, in particular in order to avoid critical situations when maneuvering at only a small distance from obstacles such as e.g. other vehicles.

For this purpose, use is made of distance sensors which are fitted to the vehicle, for example incorporated into the fender, and often operate with ultrasound for the detection of a remaining distance to an obstacle. In this case, ultrasonic signals are emitted and the distance to the reflection location, that is to say the obstacle, is ascertained from the evaluation of the received and reflected signals.

However, the accuracy with which the distance is ascertained is dependent, inter alia, on the sensor technology used. In this regard, by way of example, ultrasonic sensors indeed yield reliable information if the obstacle is situated at a distance outside a near- or short-distance range, that is to say above a minimum distance. For ultrasonic sensors, this is in the range of a few decimeters, typically above 30 cm. If this distance threshold value is undershot, however, no or a less reliable distance indication is ascertained. If a parking maneuver, for example, is then carried out, either automatically or under the control of a driver who relies on visual, acoustic or haptic warning signals from the driving assistance system, this remaining short distance is not utilized for maneuvering, and so in the case of a correspondingly small parking gap a parking maneuver cannot be carried out successfully, even though the remaining distance would possibly suffice to completely carry out the parking maneuver.

SUMMARY

It is therefore an object of the present invention to extend the usability of a driving assistance system to the effect that a remaining short-distance range additionally also becomes utilizable for maneuvering in the vicinity of obstacles.

The driving assistance system according to the invention for a vehicle comprises a longer-distance sensor device for determining longer-distance information between a vehicle and at least one obstacle. According to the invention, it is provided that the driving assistance system also has a shorter-distance sensor device for determining distance information between the vehicle and the at least one obstacle when the distance has dropped below a threshold at which the longer-distance ranging device is no longer able to yield sufficiently accurate distance information. The shorter-distance sensor device comprises one or more transmitters, one or more receivers, and at least one ranging unit and using waves of a different type or a different frequency for determining the shorter-distance information in comparison with the longer-distance sensor device for determining the longer-distance information.

The distance to an obstacle is the distance to a location at which the emitted waves are at least partly reflected, such that they can be captured by the receiver. From the intensity of the received signal or from propagation time differences or the like, the distance to the obstacle can then be determined by the ranging unit. A ranging unit can comprise, for example, a processor or microcontroller in the vehicle, e.g. having a suitable computation program for converting signals supplied by the receivers, e.g. intensities, into distances to an obstacle. The term at least one ranging unit encompasses the fact that signals generated by a plurality of transmitters and receivers can be evaluated by an associated plurality of ranging units, but also by a single unit for all the signals.

In this case, distance information is in particular the measured distance values between the vehicle and the obstacle, for example another vehicle. Since the shorter-sensor device (and also the longer-sensor device) can also have more than one sensor having a transmitter and receiver, i.e. can also have a plurality of transmitters and/or receivers, it is also possible to monitor the distances of the vehicle to more than one obstacle. Besides the distance values, the distance information can then also comprise an assignment of the measured distance values to the sensors and thus to positions on the vehicle. Distance information between a vehicle and at least one obstacle is therefore information about distances between the vehicle and the at least one obstacle, and if appropriate the spatial assignment. Longer-distance information is distance information ascertained in normal operation, that is to say a first operating mode. Shorter-distance information is distance information ascertained in short-distance operation, that is to say a second operating mode, which may be suitable for distance measurements in particular in a near- or short-distance range, that is to say can be adapted to yield better results in the short-distance range than the longer-distance sensor device.

Waves of a different type are for example waves which differ in their form of propagation, e.g. electromagnetic waves, on the one hand, and waves which require a propagation medium, on the other hand, e.g. sound waves.

The driving assistance system according to the invention thus has two different distance sensor devices that use different types of waves for ascertaining distances. It affords at least the advantage that the additional shorter-distance sensor device can use a measuring method optimized for said nearer- or shorter-distance range, even if said method is possibly in turn not suitable or only suboptimally suitable for the normal operation of the driving assistance system, in which larger distances are also detected, for example the entire length of a parking gap, and larger maneuvering movements of the vehicle are intended to be monitored.

In one embodiment, said one or said plurality of transmitters of the shorter-distance sensor device is/are configured to emit infrared waves. Correspondingly, said one or said plurality of receivers of the shorter-distance sensor device are also configured to receive a reflected portion of the emitted infrared waves, such that the at least one ranging unit or evaluation unit can determine the distance information by evaluating the transmitted and received waves. Infrared waves have approximately a wavelength of $10^{-3}$ m to $7.8 \times 10^{-7}$ m, i.e. approximately 1 mm to 780 nm, which corresponds approximately to a frequency range of $3 \times 10^{11}$ Hz to approximately $4 \times 10^{14}$ Hz, i.e. approximately 300 GHz to 400 THz. An accurate measurement even of relatively small distances is thus possible, wherein over short distances the use of infrared beams is also very robust vis-à-vis external influences, such as, for example, the light conditions in the visible range.

In a further embodiment, provision is made for using visible light, that is to say that said one more transmitters is/are configured to emit light in the visible range. Even though the reflection of visible light is more greatly influenced by external influences such as a change in the lighting conditions as a result of ambient light, one advantage resides in being able to use inexpensive conventional lighting means or in being able to evaluate the reflections of light from already existing vehicle lighting, in particular for example if the driving assistance system belongs to a vehicle that is used under controlled environmental conditions, e.g. to an autonomous vehicle in a factory building or the like.

The longer-distance sensor device likewise comprises one or a plurality of other transmitters, one or a plurality of other receivers and at least one (other or the same) ranging unit. Said one or said plurality of longer-transmitters are often configured to emit ultrasonic waves, i.e. sound waves in a frequency range of high frequencies, which is inaudible to humans, of approximately 20 kHz to 1.6 GHz.

In one embodiment of the driving assistance system, it is provided that said one or said plurality of transmitters of the shorter-distance sensor device comprise(s) one or more LED modules, operable in at least one first operating state, in which visible light is emitted, and in a second operating state, in which infrared waves are emitted. So-called dual LED modules or dual infrared LED modules are used, which emit visible light and/or infrared light depending on the operating state. Such LED modules are realized for example with a housing that accommodates two LED chips, one of which emits visible light and the other of which emits infrared. This affords the advantage that the transmitters of the shorter-distance sensor device can be positioned on the vehicle where light emitting diodes have already been provided as components of one or more of the vehicle driving-lights, which emit visible light for external lighting (to improve the vehicle driver's ability to see in a dark environment) and/or visibility (to improve the ability of other persons to see the vehicle) purposes.

In one preferred embodiment, it is therefore provided that said one or more LED modules, at least in the first operating state, constitute part of the vehicle's exterior or driving-lights system. For this purpose, some or all of the exterior LEDs, for example those of the headlights, may be replaced by dual mode LED modules which emit visible light at least in the first or driving-lights operating state, but emit infrared waves in the second or shorter-range distance ranging state. This affords the advantage of being able to integrate the transmitters of the shorter-distance sensor device into the vehicle without (or with only relatively minor) structural alterations, which is advantageous for example for the retrofittability of existing vehicles. In the case of a vehicle headlight modified in this way, a plurality (or all) of the LEDs of the headlight can be replaced by dual mode LED modules.

The vehicle exterior or driving-lights system here concerns in particular the headlights used for illumination forward of the vehicle during normal driving, but—depending on the embodiment—also other exterior light sources, for example turn indicators, tail lights, brake lights, fog lamps or reversing light.

In one embodiment of the driving assistance system, said one or said plurality of receivers of the shorter-distance sensor device comprise(s) one or a plurality of photosensors arranged on the vehicle. These can be fitted to the vehicle at appropriate locations. Depending on the embodiment, use may be made of photosensors additionally attached for this purpose, and/or of existing sensors for the detection of infrared (IR) waves, for example photochips of installed cameras in which the IR filter is temporarily deactivated.

In one exemplary embodiment, at least one of the photosensors may also provide an input to an automatic driving light control. For this purpose, use may be made, if appropriate, of already existing sensors which serve to sense ambient light for the automatic control of the driving-lights in dark environments.

In a further exemplary embodiment, at least one of the photosensors may comprise a LIDAR camera (LIDAR—light detection and ranging) arranged for example in the front region of the vehicle. If the infrared filters of the camera are deactivated, the distance information can be obtained from the recorded image sequence by applying suitable image processing algorithms.

Other cameras can also be used. In a further embodiment, by way of example, at least one of said one or said plurality of photosensors comprises a reversing camera.

In one embodiment, the driving assistance system also comprises a controller, configured to control the determination of shorter-distance information by the shorter-distance sensor device depending at least on longer-distance information received from the longer-distance sensor device. For this purpose, by way of example, it can be provided that the controller activates and deactivates the shorter-distance sensor device, or individual transmitters and/or receivers thereof, or that the signals both from the longer-distance sensor device and from the shorter-distance sensor device are indeed constantly available, but the controller decides which of the items of information will be used. In a further embodiment, the controller to that end can also respectively activate and deactivate the longer-distance sensor device if it is currently not being used or the short-distance device is currently deactivated or activated again.

In one exemplary embodiment, the controller is configured to individually drive said one or more transmitters of the shorter-distance sensor device. In this case, said controller can activate and deactivate the transmitters of the shorter-distance sensor device separately, in particular. In one embodiment, this also applies to the receivers. In this regard, it is possible to reduce the energy consumption by the shorter-distance sensor device.

In accordance with a further aspect of the invention, a method for operating a driving assistance system in accordance with one of the embodiments described is provided, which method comprises determining longer-distance information by means of the longer-distance sensor device, checking a driving-situation-related maneuvering criterion, and at least if checking the driving-situation-related maneuvering criterion reveals that the driving-situation-related maneuvering criterion is satisfied determining shorter-distance information by means of the shorter-distance sensor device.

This affords the advantage that, in a manner adapted to the current situation, a decision can be taken to base the distance information on the measurements of the shorter-distance sensor device optimized for the short-distance range, such that the maneuvering can be continued without collisions.

In this case, a driving-situation-related maneuvering criterion is the criterion taken as a basis for assessing whether the vehicle is currently entering the short-distance range with respect to an obstacle.

In one exemplary embodiment of the method, checking the driving-situation-related maneuvering criterion comprises checking the longer-distance information; and the driving-situation-related maneuvering criterion is satisfied if checking the longer-distance information reveals that a distance to the at least one obstacle is less than a distance threshold value.

The distance threshold value is a value that designates the distance starting from which the longer-distance sensor device no longer yields any or any sufficiently accurate distance information.

This affords the advantage that even after the vehicle has entered the short-distance range, accurate distance information can continue to be provided, and is available in an automatic driving assistance system for the control of the vehicle or otherwise to the driver in the form of visual, acoustic or haptic signals, for example, such that a range extended at least by part of the short-distance range can be utilized for the maneuvering of the vehicle.

If the longer-distance sensor device uses more than one associated transmitter and/or receiver, it can be provided that, as soon as one of the items of distance information thus obtained indicates that the distance threshold value has been undershot in the range of the associated sensor, the entire measurement is performed by the shorter-distance sensor device.

In a further embodiment, it is provided that for the shorter-distance sensors only exactly in the range in which the undershooting of the distance threshold value has been indicated, the transmitters and receivers of the shorter-distance sensor device that are assignable to said range are activated, while otherwise the measurements continue to be carried out by the longer-distance sensor device. In particular, to that end it can be provided that each short-distance sensor is individually activatable by the controller.

In one exemplary embodiment, the distance threshold value is in a range of 20 cm to 40 cm. By way of example, a distance threshold value of approximately 30 cm can be stipulated. In this regard, a suitable switchover value can be stipulated in particular for ultrasound-based longer-distance sensor devices, wherein infrared-based shorter-distance sensor devices function well in this range.

Preferably, provision is also made, if the remaining distance ascertained by the shorter-distance sensor device becomes greater than the distance threshold value again, for determining the distance again by means of the longer-distance sensor device.

In one preferred embodiment, the method comprises checking the shorter-distance information; and if checking the shorter-distance information reveals that the distance to the at least one obstacle is greater than the distance threshold value by at least one hysteresis value determining longer-distance information by means of the longer-distance sensor device.

The hysteresis value can be equal to zero, such that a switchover is immediately effected again. Preferably, however, the value is greater than zero. This has the advantage that in the limit range the number of switchover processes is reduced and normal operation is only resumed if it is relatively certain that the threshold value will not immediately be exceeded again.

In accordance with a further embodiment, the method comprises detecting that the vehicle is executing a parking maneuver; and wherein, if a parking maneuver is present, checking the driving-situation-related maneuvering criterion comprises checking a duration of a vehicle movement in an unchanged direction; and wherein the driving-situation-related maneuvering criterion is satisfied if checking the duration reveals that a maximum movement duration has been exceeded. The fact that precisely a parking maneuver is intended to be executed can be indicated for example to the driving assistance system by the driver (e.g. select parking mode) or can be identified on the basis of other criteria such as, for example, the slow speed of the vehicle, reverse gear being engaged, or on the basis of the pattern of the steering movements. If detecting the presence of a parking maneuver comprises the fact that the size or dimensions of a parking gap is or are also detected, the maximum movement duration can for example also be ascertained from the vehicle speed, the length of the vehicle and the size of the parking gap.

In a further embodiment, the method comprises detecting a presence of a parking maneuver; and wherein, if a parking maneuver is present, checking the driving-situation-related maneuvering criterion comprises checking a path length in the case of a vehicle movement in an unchanged direction; and wherein the driving-situation-related maneuvering criterion is satisfied if checking the path length reveals that a maximum path length has been exceeded. The maximum path length can be determined for example depending on the size of the parking gap.

In one embodiment of the method, checking the longer-distance information comprises assigning ranges for which the distance is below the distance threshold value to transmitters of the shorter-distance sensor device, and determining short-distance operation distance information by means of the shorter-distance sensor device comprises the fact that the determining is carried out only using the transmitters that were assigned to ranges for which the distance is below the distance threshold value. For this purpose, the controller can be correspondingly designed to activate the short-distance sensors separately as well, if appropriate.

In one embodiment of the method, determining shorter-distance information by means of the shorter-distance sensor device comprises the fact that the determining is carried out only using the transmitters which contribute to determining shorter-distance information for ranges in a direction of movement of the vehicle. Contact with an obstacle would most probably run in the direction of movement. By only utilizing the sensors in the direction of movement, this affords the advantage, for example, of being able to reduce the energy consumption for the operation of the shorter-distance sensor device.

In accordance with a further embodiment, the method additionally comprises detecting a length of a parking gap. In this embodiment, checking the driving-situation-related maneuvering criterion comprises checking the length of the parking gap; and the driving-situation-related maneuvering criterion is satisfied if the length of the parking gap is above a minimum maneuvering length dependent on a length of the vehicle, but below a short-distance maneuvering length. The length of the parking gap is detected by the longer-distance sensor device, for example. If on the basis of the length of the parking gap it is already possible to establish that the use of the shorter-distance sensor device is necessary, switching back and forth between the different distance sensor devices is dispensed with and the parking maneuver is carried out completely using the shorter-distance sensor device. This has the advantage that the operating state remains stable and less energy is consumed by switching processes and by both distance sensor devices otherwise being operated possibly simultaneously at times.

In accordance with yet another embodiment, the method comprises detecting multidimensional dimensions of a parking gap and selecting the number and positions of the transmitters and receivers of the shorter-distance sensor device that are to be used for determining the shorter-distance information depending on the dimensions. This embodiment involves determining not just the length of the parking gap, but at least another item of spatial information in a different dimension, for example the width or depth of the parking gap or the position on the roadway (e.g. left or right edge of the road) or the type of parking gap (e.g. parking longitudinally or perpendicularly). In this regard, on the basis of the shape or the layout of the parking gap, a number and position of the transmitters and receivers of the shorter-distance sensor device that are to be activated or used can be selected in a manner dependent thereon.

In this case, provision is made, in particular, for activating more sensors in those regions of the vehicle in which the distance to the obstacle will probably be the smallest at first. By way of example, provision can be made, in particular, during a parking maneuver in the direction of the roadway, for monitoring, on the side of the vehicle facing the center of the roadway, the corner region in the direction of travel of the vehicle with more sensors than the corner region facing the edge of the roadway in the direction of travel, i.e. for example during reverse parking in the longitudinal direction on the right-hand side of the roadway, during the first stage, for activating more sensors at the rear on the left and fewer sensors at the rear on the right.

The invention is explained in greater detail below in association with the following description of exemplary embodiments with reference to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Other embodiments can be used and structural or logical changes can be made, without departing from the scope of protection of the present invention. The features of the various exemplary embodiments described above and below can be combined with one another, unless specifically indicated otherwise. Therefore, the description should not be interpreted in a restrictive sense, and the scope of protection of the present invention is defined by the appended claims.

Figure 1:
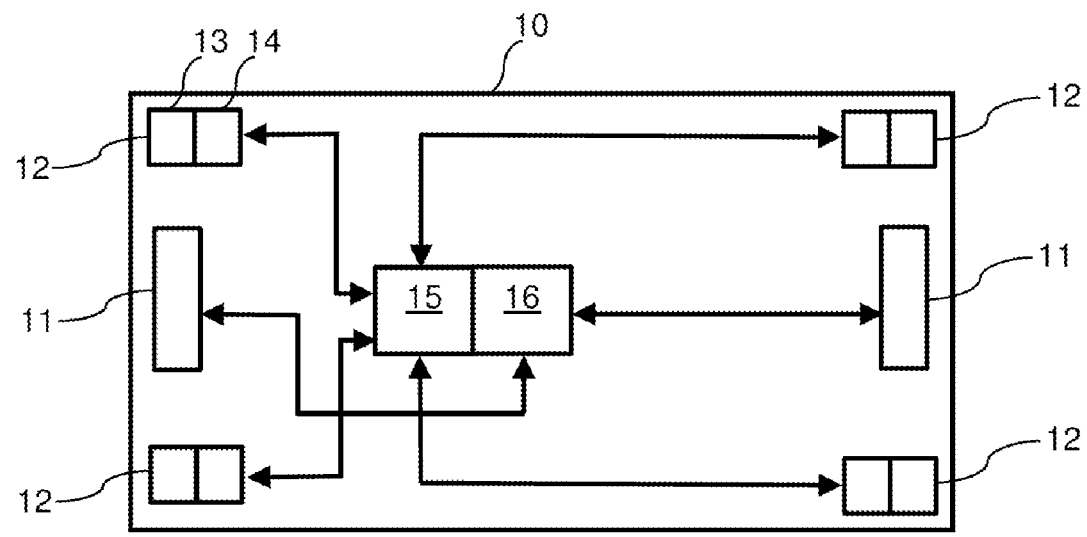
FIG. 1 shows a schematic illustration of an example of a vehicle comprising a driving assistance system in accordance with one embodiment of the invention.

FIG. 1 shows a schematic illustration of an example of a vehicle comprising a driving assistance system in accordance with one embodiment of the invention. The vehicle 10 comprises a driving assistance system comprising two different distance sensor devices for determining distances between the vehicle 10 and obstacles possibly present, firstly a longer-distance sensor device 11, which determines distances for example by emitting ultrasonic waves, capturing reflected portions of the emitted ultrasonic waves and calculating the distances for example from propagation time differences or intensity variations. In addition, the driving assistance system of the vehicle 10 comprises a shorter-distance sensor device 12 for determining shorter-distance information between the vehicle and the obstacle or obstacles. The shorter-distance sensor device 12 shown comprises a plurality of transmitters 13 and a plurality of receivers 14 and a ranging unit 15 and uses waves of a different type or a different frequency for determining the shorter-distance information in comparison with the longer-distance sensor device for determining the longer-distance information, for example infrared waves instead of ultrasonic waves. Furthermore, the driving assistance system of the vehicle 10 comprises a controller 16, which is directly or indirectly connected to the longer-distance sensor device 11 and the shorter-distance sensor device 12 and is configured to control the determination of shorter-distance information by the shorter-distance sensor device 12 depending at least on longer-distance information received from the longer-distance sensor device 11. For this purpose, the controller 16 can activate and deactivate the transmitters 13 and receivers 14 of the shorter-distance sensor device 12. The controller 16 may also control the activation and deactivation of the transmitters and receivers of the longer-distance sensor device 11.

Figure 2:
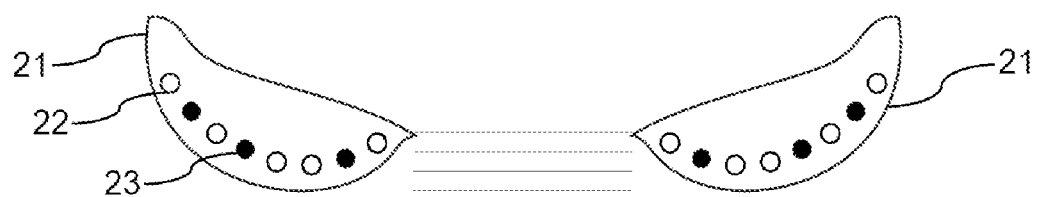
FIG. 2 shows a schematic illustration of an example of modified vehicle headlights.

FIG. 2 shows a schematic illustration of an example of modified vehicle headlights. The vehicle headlights 21 shown are LED headlights of a vehicle comprising features of a driving assistance system according to the invention. Besides conventional headlight LEDs 22 (shown white in the illustration) operative to emit visible light to illuminate the environment ahead of the vehicle during normal vehicle operation, said headlights additionally comprise dual visible/infrared LED modules/units 23 (shown black in the illustration), which in a first operating mode emit visible light just like the conventional LEDs, but in a second operating mode emit infrared waves and serve as transmitters of the shorter-distance sensor device. In order to modify the headlights, in headlights having exclusively conventional LEDs some of said LEDs were replaced by dual visible/infrared LED modules/units 23, such that it was possible to avoid a more extensive structural alteration of the headlights.

In one exemplary embodiment, one (or more) of the shorter-distance receivers 14 may be a photosensor that also provides inputs for use in controlling an automatic day/night driving-light system. As is well known in the art, such systems sense ambient light and automatically control one or more of the driving-lights depending upon the amount of ambient light in the vehicle's environment. In this embodiment, the controller 16 may be part of and/or implement the automatic day/night driving-light function.

Figure 3:
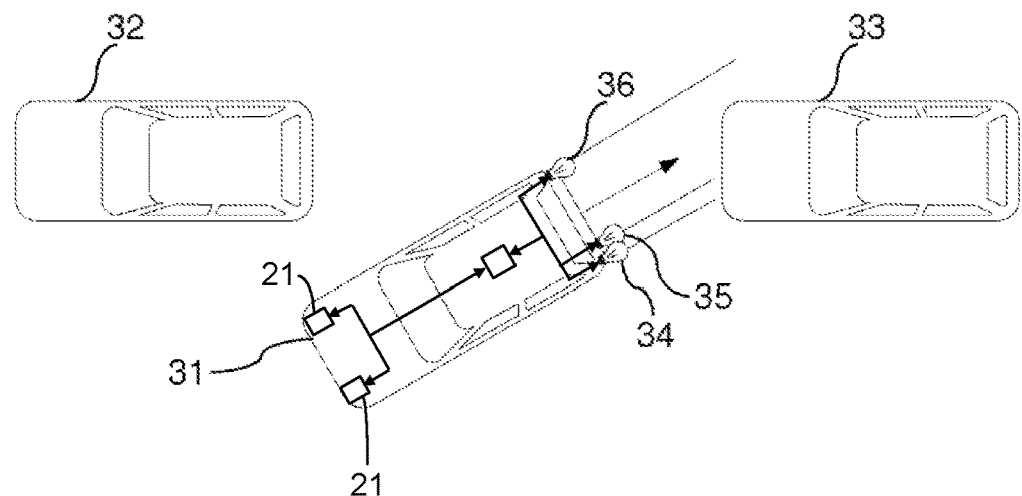
FIG. 3 shows a schematic illustration for selectively activated short-distance distance sensors during a parking maneuver.

FIG. 3 shows a schematic illustration for selectively activated short-distance distance sensors during a parking maneuver. The illustration shows a vehicle 31 currently executing a maneuver of reverse parking into a parking gap in the longitudinal direction between two further vehicles 32, 33 at the right-hand edge of the roadway. The short-distance distance sensor device is activated only in the rear region of the vehicle. Infrared wave transmitters integrated into the reversing lights have been activated by the controller 16 both at the rear on the left and at the rear on the right. However, since contact between the parking vehicle 31 and the vehicle 33 would probably initially occur at the back of the vehicle 31 at the rear on the left on account of the smaller distance remaining, the controller activated the two dual infrared LEDs 34, 35 in the infrared transmission operating mode, whereas it activated only one dual infrared LED 36 at the rear on the right.

Figure 4:
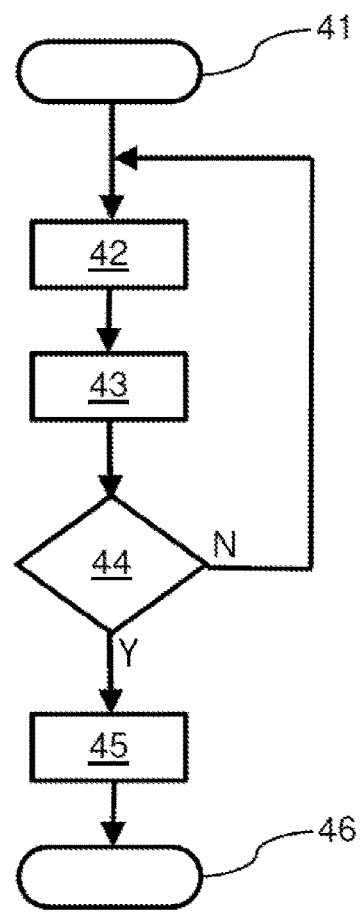
FIG. 4 shows a schematic illustration of a method for operating a driving assistance system in accordance with one embodiment of the invention.

FIG. 4 shows a schematic illustration of a method for operating a driving assistance system in accordance with one embodiment of the invention. After the start 41, the method provides a step 42 of determining longer-distance information by means of the longer-distance sensor device. In addition, a further step 43 involves checking a driving-situation-related maneuvering criterion, for example whether the longer-distance information indicates that a distance threshold value has been undershot or that a parking gap is longer than the vehicle but undershoots a defined minimum size for normal operation, etc. At least if checking the driving-situation-related maneuvering criterion reveals 44 that the driving-situation-related maneuvering criterion is satisfied, determining shorter-distance information by means of the short-distance distance sensor device is carried out in a further step 45. Otherwise, longer-distance information continues to be determined. The method ends 46 if the driving assistance system is switched off, for example when the vehicle is at a standstill.

Figure 5:
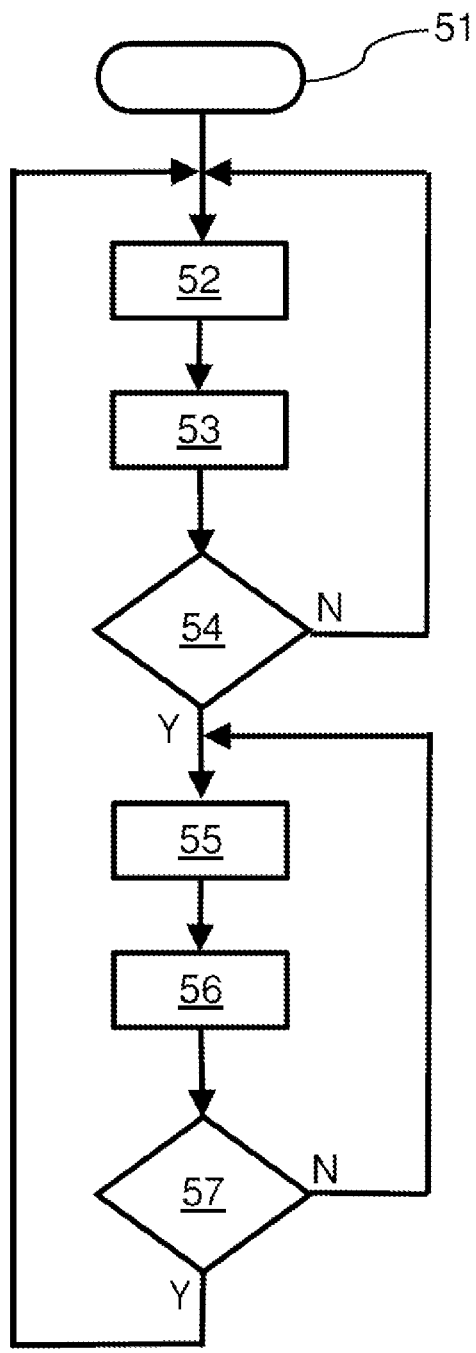
FIG. 5 shows a further schematic illustration of a method for operating a driving assistance system in accordance with a further embodiment of the invention.

FIG. 5 shows a further schematic illustration of a method for operating a driving assistance system in accordance with a further embodiment of the invention. After the start 51, the method provides a step 52 of determining longer-distance information by means of the longer-distance sensor device. In addition, checking the longer-distance information thus determined is carried out in a further step 53. If checking the longer-distance information reveals 54 that a distance to an obstacle is less than a distance threshold value, determining shorter-distance information by means of the short-distance distance sensor device is carried out in a further step 55. Otherwise, longer-distance information continues to be determined. The short-distance distance information determined in step 55 is checked in a further step 56. If checking the shorter-distance information reveals 57 that the distance to the obstacle is greater than the distance threshold value by at least one hysteresis value, a switchover is made to the longer-distance sensor device again and longer-distance information is determined by means of said longer-distance sensor device. Otherwise, short-distance operation is continued and short-distance distance information continues to be determined by means of the short-distance distance sensor device. The method ends if the driving assistance system is switched off, for example when the vehicle is at a standstill.

Method steps, even though described in accordance with a certain ordered sequence, could be performed in a different sequence than that described here. It furthermore goes without saying that certain steps could be carried out simultaneously, that other steps could be added or that certain steps described here could be omitted. In other words: the present descriptions are provided for the purpose of illustrating specific embodiments and should not be interpreted as a restriction of the subject matter disclosed.

Although the invention has been illustrated and described in greater detail by means of the exemplary embodiments, nevertheless the invention is not restricted by the examples disclosed and other variations can be derived therefrom by the person skilled in the art, without departing from the scope of protection of the invention.

The figures are schematic illustrations and not necessarily accurate in every detail and true to scale and may be illustrated for example in an enlarged or reduced size in order to afford a better overview. Therefore, functional details disclosed here should not be understood to be restrictive, but rather merely as an illustrative basis which offers the person skilled in the art in this technological field instructions for using the present invention in diverse ways.

The expression "and/or" used here, if it is employed in a series of two or more elements, means that each of the elements presented can be used by itself, or any combination of two or more of the elements presented can be used. By way of example, if a composition is described such that it contains the components A, B and/or C, the composition can contain A by itself; B by itself; C by itself; A and B in combination; A and C in combination; B and C in combination; or A, B, and C in combination.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Vehicle-mounted ranging apparatus comprising:
   a driving-light having a light emitting diode (LED) module operable to emit visible light for vehicle exterior lighting, and to emit infrared light;
   an infrared receiver;
   a longer-distance sensing unit operable to detect a length of a parking gap; and
   a controller directing, when the length of the parking gap is above a minimum maneuvering length dependent on a length of the vehicle and below a short-distance maneuvering length, the LED module to emit infrared light and determining distance to an object adjacent to the parking gap from infrared light reflected from the object and detected by the infrared receiver.

2. The apparatus of claim 1, further wherein:
   the longer-distance sensing unit comprises an ultrasonic sensor device.

3. The apparatus of claim 1, wherein the driving-light is a headlight.

4. The apparatus of claim 1, wherein the driving-light is a reversing light.

5. The apparatus of claim 1, wherein the infrared receiver comprises a photosensor operative to control an automatic driving light circuit.

6. A method for operating a driving assistance system of a motor vehicle, comprising:
- operating a dual-mode light emitting diode (LED) module to emit visible light as part of a driving-light system of the vehicle;
- monitoring a distance between the vehicle and an object using a longer-distance sensing unit; and
- operating a controller to, in response to a determination that the distance has fallen below a threshold value in a range of 20 cm to 40 cm, activate the LED module to emit infrared light, and activate a receiver to detect infrared light reflected from the object, and determine distance to the object therefrom.

7. The method of claim 6, wherein the longer-distance sensing unit utilizes ultrasonic waves to measure distance.

8. The method of claim 6, further comprising
- in response to a determination that the vehicle is executing a parking maneuver, operating the controller to activate the LED module to emit infrared light, and activate the receiver to detect infrared light reflected from the object, and determine distance to the object therefrom.

9. The method of claim 8, further comprising:
- operating the longer-distance sensing unit to detect a length of a parking gap; and
- activating the LED module to emit infrared light and the receiver to receive reflected infrared light if the length of the parking gap is above a minimum maneuvering length dependent on a length of the vehicle, and below a short-distance maneuvering length.

10. A method for operating a driving assistance system of a motor vehicle, comprising:
- operating a dual-mode light emitting diode (LED) module to emit visible light as part of a driving-light system of the vehicle;
- operating a longer-distance sensing unit to monitor a distance between the vehicle and an object, and to detect a length of a parking gap; and
- operating a controller to, in response to a determination that a) the distance has fallen below a threshold value, b) the vehicle is executing a parking maneuver, and c) the length of the parking gap is above a minimum maneuvering length dependent on a length of the vehicle and below a short-distance maneuvering length, activate the LED module to emit infrared light, and activate a receiver to detect infrared light reflected from the object, and determine distance to the object therefrom.

11. The method of claim 10, wherein the dual-mode LED is part of a headlight.

12. The method of claim 10, wherein the dual-mode LED is part of a reversing light.

13. The method of claim 10, wherein the infrared receiver comprises a photosensor providing an input to an automatic driving light circuit.

14. The method of claim 10, wherein the longer-distance sensing unit comprises an ultrasonic sensor device.

15. A method for operating a driving assistance system of a motor vehicle, comprising:
- operating a dual-mode light emitting diode (LED) module to emit visible light as part of a driving-light system of the vehicle;
- operating a longer-distance sensing unit to detect a length of a parking gap; and
- operating a controller to, in response to a determination that a) the vehicle is executing a parking maneuver, and b) the length of the parking gap is above a minimum maneuvering length dependent on a length of the vehicle and below a short-distance maneuvering length, activate the LED module to emit infrared light, and activate a receiver to detect infrared light reflected from an object adjacent to the parking gap, and utilizing distance information from the receiver to complete the parking maneuver.

* * * * *